E. K. STOCKTON.
LOADING DEVICE.
APPLICATION FILED FEB. 3, 1914.
1,129,432.
Patented Feb. 23, 1915.
2 SHEETS—SHEET 1.
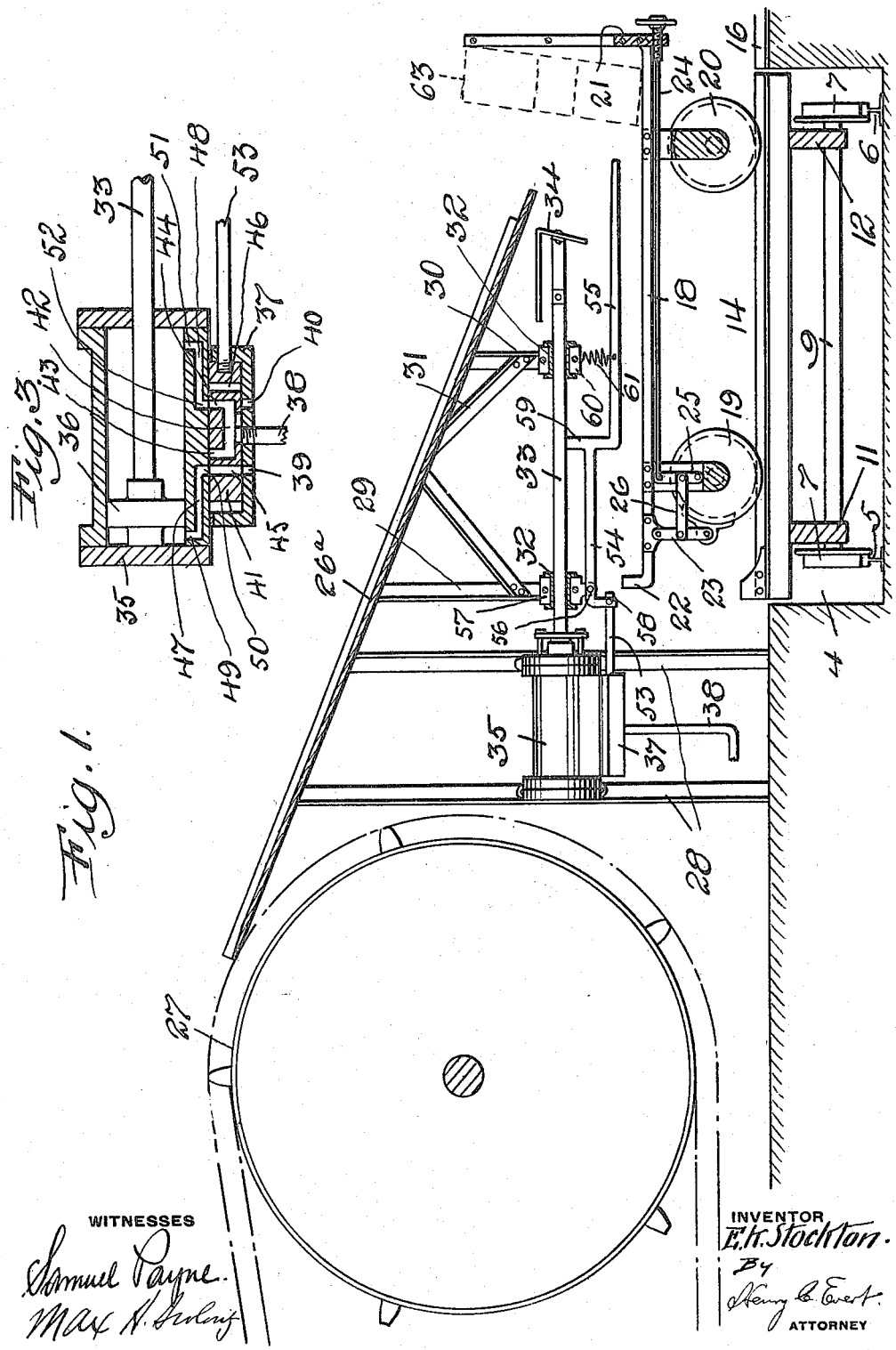
WITNESSES
Samuel Payne.
Max N. ...
INVENTOR
E. K. Stockton.
By
Henry C. Evert.
ATTORNEY

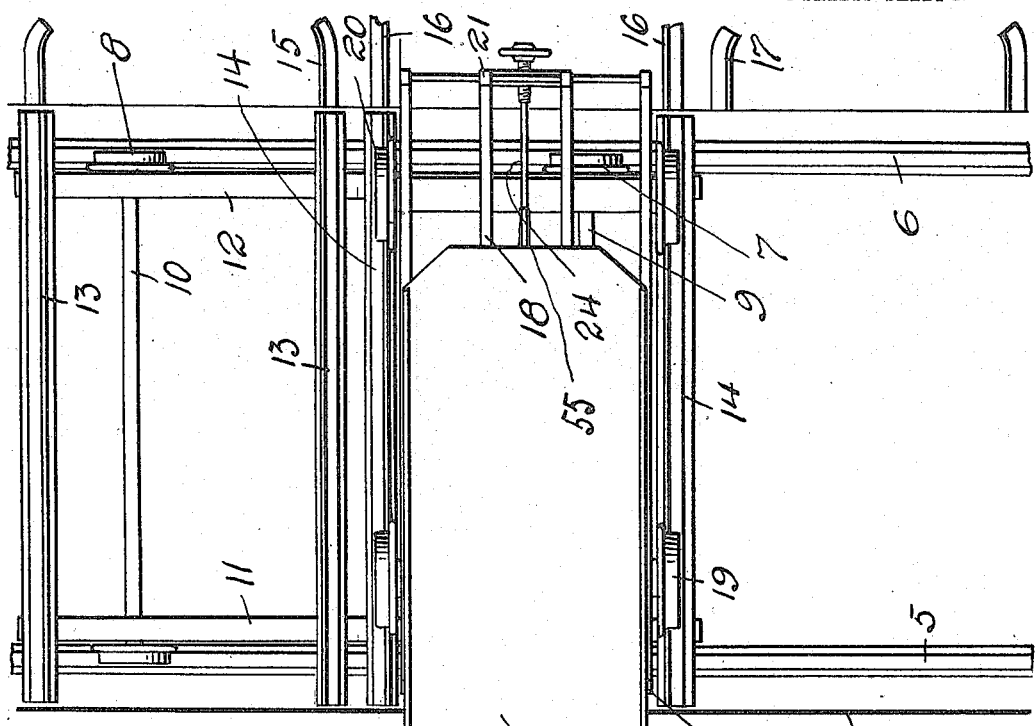

UNITED STATES PATENT OFFICE.

EARL K. STOCKTON, OF MONESSEN, PENNSYLVANIA.

LOADING DEVICE.

1,129,432. Specification of Letters Patent. Patented Feb. 23, 1915.

Application filed February 3, 1914. Serial No. 816,261.

*To all whom it may concern:*

Be it known that I, EARL K. STOCKTON, a citizen of the United States of America, residing at Monessen, in the county of Westmoreland and State of Pennsylvania, have invented certain new and useful Improvements in Loading Devices, of which the following is a specification, reference being had therein to the accompanying drawing.

This invention relates to loading devices, and has for its object to provide a device of such class, in a manner as hereinafter set forth, for loading reels of wire in standing position upon a truck whereby after the truck has been filled the reels can be conveniently removed from the truck by a bar or rod extended through the reels when occasion so requires. The manner of loading the reels of wire upon a truck is through the medium of a plurality of operators shifting the reels to standing position after the reels have been deposited upon the truck, the truck being manually shifted after one reel has been arranged in an upright manner to provide space for the succeeding reel and to overcome the manual shifting of the reels and truck is the primary object of this invention, and to this end the invention aims to provide means for automatically standing the reels and simultaneously with the positioning of the reels in such manner to automatically shift the truck to make space for the reception of a succeeding reel to be positioned in an upright manner.

Further objects of the invention are to provide a loading device for the purpose set forth which is simple in its construction and arrangement, automatic in its operation, reducing materially the expense of loading the reels properly upon a truck, strong, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is an elevation partly in section of a loading device in accordance with this invention showing the adaptation thereof with respect to a truck and the conveyer for the reels of wire, Fig. 2 is a top plan view of the loading device showing the adaptation thereof in connection with a truck to be loaded, and Fig. 3 is a longitudinal sectional view of the ram cylinder. Fig. 4 is a view of the ram head.

Referring to the drawings in detail, 4 denotes a pit in which is arranged a pair of track rails 5 and 6, upon which travels the pair of wheels 7 and 8 of a carriage. The carriage includes a pair of axles 9 and 10, the former being connected to the wheels 7, while the latter is attached to the wheels 8, and mounted upon the axles 9 and 10 is a pair of supports 11 and 12, which extend at right angles with respect to the axles 9 and 10, and mounted upon the said supports 11 and 12 are two pair of track rails, the rails of one pair being indicated by the reference character 13, and the rails of the other pair by the reference character 14. Leading to the pit 4 at one side thereof is illustrated, by way of example, three pair of track rails, the rails of one pair being indicated at 15, the rails of another pair at 16 and the rails of the remaining pair by the reference character 17. The rails 15 and 16 are adapted to aline with the rails 13. The carriage may be shifted so that the rails 13 and 14 will be in alinement with rails 15 and 16 or 16 and 17, so that the carriage may be shifted thereto. The carriage is utilized for transferring a truck from the rails 15 to the rails 16 and for transferring a truck from the rails 17 to rails 16.

As illustrated, the truck referred to in the preceding paragraph is indicated by the reference character 18 and is provided with front and rear wheels 19 and 20 respectively, which are mounted upon the rails 14. The front end of the truck is formed with a skeleton upright 21 and the rear end with a vertically disposed flange 22. Depending from the rear of the truck 18 is a brake mechanism 23, which associates with the rear wheels 19 and said brake mechanism is operated through the medium of an operating rod 24, which is connected to a pivot lever 25, the latter having attached thereto a pivoted link 26 which is connected to the brake mechanism 23. When the rod 18 is shifted rearwardly, the brake mechanism 23 is moved clear of the wheels 19 and when moved forwardly, the brake mechanism is shifted to engage the wheels 19 to arrest movement of the truck 18. The reference character 26ª denotes an inclined chute which leads from a conveyer 27, the latter conveying the reels of wire to the chute 26ª whereby said reels will slide down the chute and drop off the lower end thereof. The chute 26ª is supported upon the uprights 28 and has depending therefrom forwardly of the uprights 28, a pair of hangers 29, 30, pressed through the medium of the inclined members 31. Each of the hangers 29 and 30, at its lower end is provided with a bearing 32 through which slides a ram 33, the latter having its outer end provided with an angle-shaped head 34.

The ram 33 extends into a cylinder 35 and is provided with a piston head 36, the latter being capable of reciprocating within the cylinder 35 upon the application of fluid pressure thereto, by way of example steam. The cylinder 35 has connected thereto a slide valve casing 37 having communicating therewith a steam supply pipe 38. The casing 37 is formed with a pair of outlet ports 39, 40, and arranged in said casing 37 is a slide valve 41 having an inlet chamber 42 into which opens a pipe 38. The valve 41 is furthermore provided with a pair of ports 43 and 44, which lead from the chamber 42, and said valve 41 is furthermore provided with a pair of outlet passages 45 and 46. The cylinder 35 has the wall thereof formed with a pair of longitudinally extending passages 47 and 48, the former opening into a port 48 at one end and in a port 49 at the other end. The ports 48 and 49 are disposed in opposite directions with respect to each other and the port 49 opens in the cylinder 35, while the port 50 opens into the slide valve casing 41. The port 48 at one end opens into a port 51, while at its other end it opens into a port 52. The ports 51 and 52 extend in opposite directions with respect to each other and the port 51 opens into a cylinder 35 at that end opposite the end in which the port 49 opens. The port 52 opens into the slide valve casing 37. Connected to the slide valve 41 in a valve stem 53, which projects from one end of the slide valve casing 37. When the slide valve is in the position shown in Fig. 3, steam is supplied to one end of the cylinder through the ports 44 and 52, the passage 48 and port 51, the passage 46 being closed to the port 40. The steam is exhausted from the other end of the cylinder through the port 49, passage 57, port 50, passage 45 and port 39, the latter registering with the passage 45 and the port 50 registering with the passage 45. If the slide valve is shifted from the position shown in Fig. 3, the passage 45 is shifted from registration with the port 50 and said passage 45 is closed to the port 49, but the port 43 registers with the port 50, whereby steam is supplied to that end of the cylinder into which opens the port 49. When steam is supplied through port 49 to the cylinder 35, the port 44 is closed to the port 52, but the passage 56 registers with the port 52 and with the port 40 whereby steam will exhaust from the cylinder through the port 51.

The cylinder 35 is supported by the uprights 28 in any suitable manner.

The slide valve 41 is shifted through the medium of the angle-shaped extension 54 of an L-shaped operating lever 55. The extension 54 is pivotally connected as at 56 to the support 57 for that bearing 32 carried by the hanger 29. The extension 54 has its free end pivoted as at 58 to the outer end of the valve stem 53. The extension 54 is formed integral with the vertical arm 59 of the operating lever 55, and said arm 59 normally engages the ram 33. The operating lever 55 is connected to the support 60 for that bearing 32 carried by the hanger 30 by a coiled pulling spring 61, the function of the latter being to normally maintain the lever 55 in an inoperative position and the slide valve in the position as shown in Fig. 3. When the lever 55 is shifted in the manner as hereinafter referred to, the extension 54 is shifted upon its pivot, such action moving the valve stem 53 in the casing 37 whereby the slide valve is shifted from the position shown in Fig. 3 so that steam will be supplied to the cylinder 35 through the port 49 and the piston 36 will be moved toward that end of the cylinder 35 into which the port 51 opens. When the piston 36 is moved in the manner as stated, the ram 33 is shifted outwardly for a purpose to be presently referred to. The normal position of the ram 33 is that the head 34 thereof, will be arranged near the lower end of the chute 26ª. The position of the lever 55 is such that the free end thereof will project beyond the head 34 and also beyond the lower end of the chute 26ª, whereby when a reel of wire is discharged from the lower end of the chute it will drop upon the projecting end of the lever 55, lower said lever so that the extension 54 will be shifted upon its pivot 56, under such conditions actuating the valve stem 53. The weight of the reel upon the lever 55 will maintain the free end thereof in a lowered position, under such conditions the slide valve 41 will remain in the position to which it has been shifted, such position being opposite to that shown in Fig. 3 until the reel of wire has been moved off the projecting end of the lever 55 and which will enable the lever 55 to be restored to normal position through the medium of the spring 61, and when said lever 55 returns to normal position, the slide valve 41 will be shifted to the position shown in Fig. 3. When the lever 55 is depressed by the weight of the reel of wire and the slide valve 41 shifted, the steam will enter the cylinder 35 through the port 49 and force the piston head 36 toward that end of the cylinder 35 into which opens the port 51. As the piston head 36 is moved in the manner just stated, the ram 33 will be shifted outwardly and the head 34 engaging with the reel of wire will move the same to standing position, as indicated in dotted lines at 63 Fig. 1. When the reel of wire is shifted to an upright position, the truck 18 is also shifted through the medium of the ram 33, but the movement of the truck will be arrested by an operator applying the brake mechanism 23. The distance which the truck 18 is shifted depends upon the space required for the succeeding reel of wire. When the reel of wire is shifted to an upright position it is moved off the lever 55, under such conditions the lever 55 can be restored to normal position.

If through any cause the reel of wire is shifted off of the lever 55 and the ram 33 recedes, the operator who is employed for braking the truck, will lower the lever 55 so that the ram 33 will perform the necessary function to shift the reel of wire to an upright position. After the truck 18 has been shifted to receive its full capacity, the truck is completely removed from the rails 14 and moved to the point desired after which the reels of wire are removed from the truck. When the truck 18 is shifted from the track rails 14, the carriage is then moved to position a truck below the chute.

The carriage can be provided with any suitable braking means to prevent movement thereof during the loading of the truck.

During the loading operation, the reels of wire which have been shifted to standing position, are so placed that the innermost reel will assist in maintaining the oncoming reel at an inclination so that it can be engaged by the ram 33 and shifted to the desired position. This further tends to cause the oncoming reel to strike the lever 55 to lower the free end thereof to throw the ram 33 into operation.

What I claim is:—

1. A loading device comprising an inclined chute for conducting reels of wire to a truck, a portable truck arranged below said chute and normally projecting beyond the lower end of the chute and adapted to successively receive the reels of wire discharged from the chute, and an automatically operable mechanism associated with the chute and truck and intermittently operated by the reels discharged from said chute to shift the reels to upright position upon the truck and to intermittently shift the truck outwardly with respect to the lower end of said chute.

2. A loading device comprising a portable truck, means for discharging successively reels of wire upon said truck, an intermittently operable and fluid pressure actuated ram capable of engaging said reels for shifting them to an upright position upon the truck, and a controlling means for the operation of said ram, said means actuated by the weight of a reel to throw the ram into operation to shift the reel into upright position.

3. A loading device comprising a portable support, means for successively conducting reels of wire to said support, and an intermittently operable fluid pressure actuated mechanism for successively shifting to standing position the reels when supplied to the support, said mechanism including means actuated by the weight of a reel for throwing said mechanism into operation to shift the reel to standing position.

4. A loading device comprising a portable support, means for conducting reels of wire to said support, a fluid pressure operated mechanism associated with said support and intermittently thrown into operation by the reels when supplied to the support whereby the reels are shifted to standing position, and a portable support intermittently shifted to form space for an oncoming reel.

5. A loading device comprising a portable support, means for conducting reels of wire to said support, a fluid pressure operated device for shifting said reels to standing position upon said support for further intermittently shifting the support to form space for an oncoming reel, and a lever mechanism controlling the operation of said means and capable of being actuated intermittently by an oncoming reel whereby said means will be intermittently operated to shift the reels in the support.

6. A loading device comprising a portable truck, an inclined chute for conducting reels of wire to said truck, supporting means for the chute, a fluid pressure operated mechanism connected with said supporting means and capable of being intermittently operated to successively shift the reels to standing position when supplied to the truck and for further intermittently shifting the truck to form space for an oncoming reel, and a controlling lever mechanism for said fluid pressure operated mechanism, said lever mechanism positioned in the path of and intermittently engaged and operated by the reels when discharged from the chute whereby said fluid pressure operated mechanism will be thrown into operation and the reels shifted to upright position, and the lever mechanism and said truck intermittently shifted, said lever mechanism including means for restoring it to normal position when the weight of a reel has been moved off of said lever mechanism.

7. A loading device comprising a portable truck, an inclined chute for conducting reels of wire to said truck, supporting means for the chute, a fluid pressure operated mechanism connected with said supporting means and capable of being intermittently operated to successively shift the reels to standing position when supplied to the truck and for further intermittently shifting the truck to form space for an oncoming reel, a controlling lever mechanism for said fluid pressure operated mechanism, said lever mechanism positioned in the path of and intermittently engaged and operated by the reels when discharged from the chute whereby said fluid pressure operated mechanism will be thrown into operation and the reels shifted to upright position and the lever mechanism and said truck intermittently shifted, said lever mechanism including means for restoring it to normal position when the weight of a reel has been moved off of said lever mechanism, and means for braking said truck to limit the shifting movement thereof by said fluid pressure operated mechanism.

In testimony whereof I affix my signature in the presence of two witnesses.

EARL K. STOCKTON.

Witnesses:
 JOHN REED,
 RHODA ARMSTRONG.

Copies of this patent may be obtained for five cents each, by addressing the "Commissioner of Patents Washington, D. C."